Patented Apr. 7, 1925.

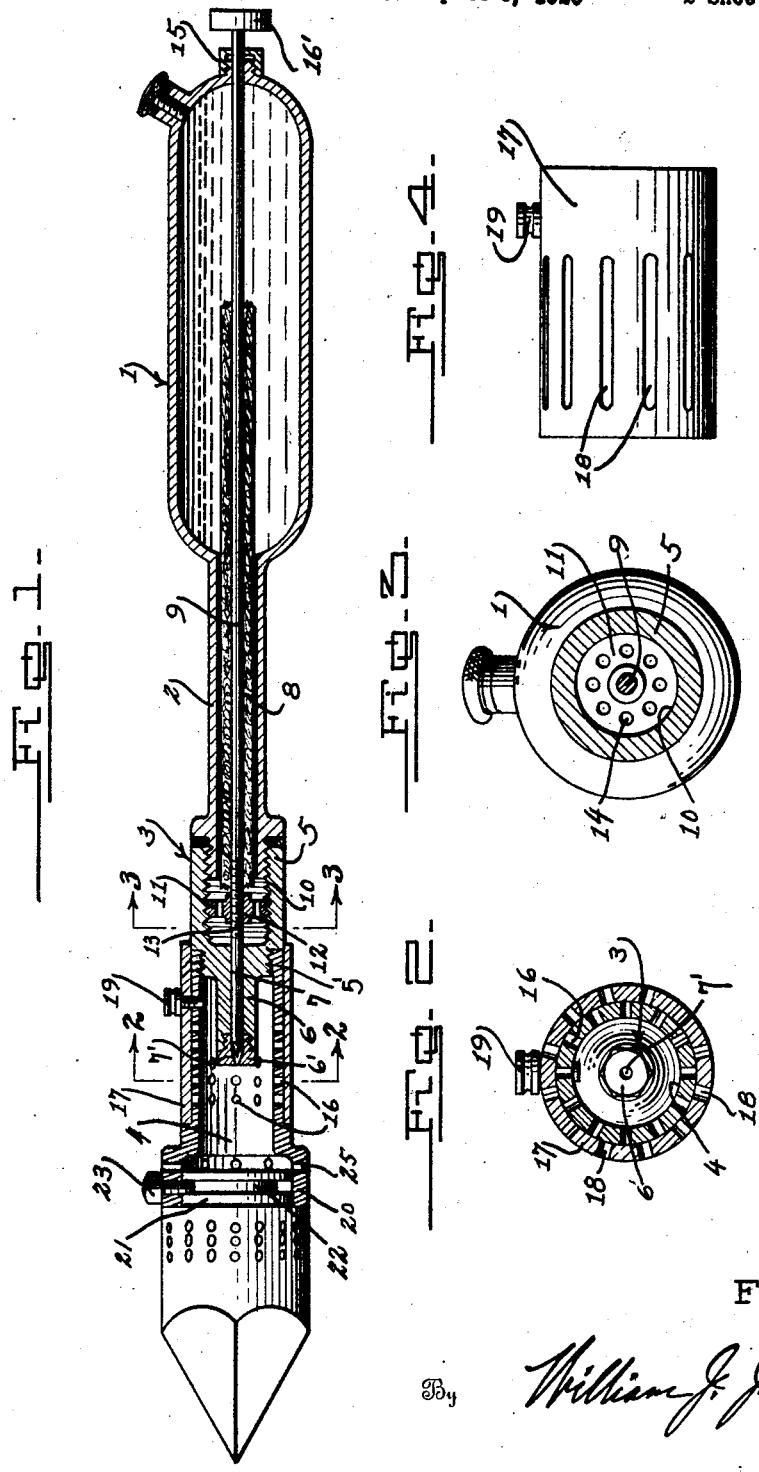

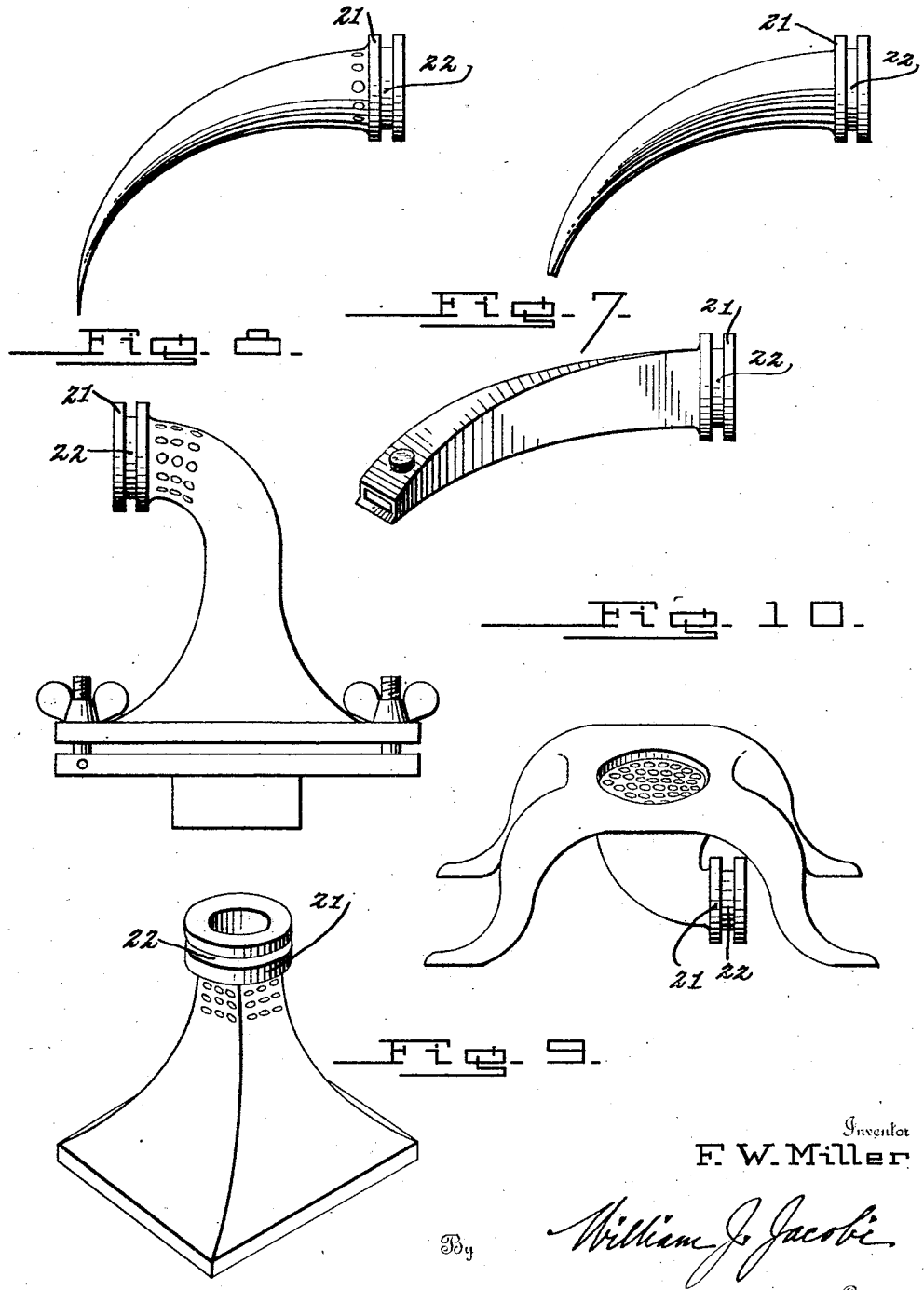

1,533,024

UNITED STATES PATENT OFFICE.

FRED W. MILLER, OF SEYMOUR, CONNECTICUT.

SELF-HEATED TOOL.

Application filed April 6, 1923. Serial No. 630,286.

*To all whom it may concern:*

Be it known that FRED W. MILLER, a citizen of the United States, residing at Seymour, in the county of New Haven and State of Connecticut, has invented certain new and useful Improvements in Self-Heated Tools, of which the following is a specification.

This invention relates to a self heated tool and has for its principal object to provide a device which is adapted to heat a tool automatically and is of such a construction as to enable the parts to be interchangeable whereby a number of different tools may be used in connection with the same heating member.

Another important object of the invention is to provide a self heated tool of the above mentioned character, which is of such a construction as to enable the same to be used for various purposes and furthermore is adapted to be carried in the hands of the operator thereby rendering the same a portable contrivance which renders it very useful and easily manipulated.

Another important object of the invention is to provide a self heated tool of the above mentioned character, which is provided with means for enabling the heating member to be attached to various kinds of tools and furthermore is provided with means for regulating the amount of heat necessary to provide for proper operation of the tool carried thereby.

A still further object of the invention is to provide a self heated tool of the above mentioned character, which is simple in construction, inexpensive, strong, durable and further well adapted for the purpose for which it is designated.

Other objects and advantages of this invention will become apparent during the course of the following description.

In the accompanying drawings forming a part of the specification and in which like numerals designate like parts throughout the same:—

Figure 1 is a longitudinal sectional view of my invention showing a soldering copper associated therewith.

Figure 2 is a transverse section taken on lines 2—2 of Fig. 1, looking in the direction of the arrows.

Figure 3 is a sectional view taken on line 3—3 of Fig. 1.

Figure 4 is a side elevation of the sleeve associated with the burner.

Figure 5 is a side elevation of a tool used in surgery and which is adapted for use with my heater.

Figure 6 is a brazing tool which is also adapted for use in connection with my invention.

Figure 7 is a paint burning tool.

Figure 8 is a tire vulcanizing tool.

Figure 9 is a branding tool, and

Figure 10 is a gas stove which is also used in connection with my invention.

In the drawings wherein for the purpose of illustration is shown the preferred embodiment of my invention, the numeral 1 designates a reservoir, tubular in form, and for convenience made relatively long in proportion to its cross sectional dimension whereby the same acts as a handle for the device. The inner end of the reservoir 1 is connected to a hollow shank 2, and at the outer end of the hollow shank 2 is mounted the burner designated generally by the numeral 3.

The burner 3 comprises a tubular body portion 4 and is provided with a tubular neck 5 whereby the burner is carried by the shank 2 and the opposite end of the burner 3 is open.

The tubular body portion 4 of the burner 3 is furthermore provided with a centrally located inwardly extending member 6 and this member 6 extends inwardly from the neck portion 5 of the tubular body portion 4 a suitable distance as more clearly shown in Fig. 1 of the drawings and is provided with the axial bore 7. The outer end of the axial bore 7 may be tapered and this provides what I term a combustion orifice. A wick designated by the numeral 8 has one end thereof extending in the reservoir 1 and extends from the reservoir 1 through the hollow shank 2 and into the tubular neck portion 5 of the tubular body portion 4 of the burner 3. This arrangement is more clearly shown in Fig. 1 of the drawings. The wick 8 as shown in the drawings and whereby the fuel such as gasoline or the like which is contained in the reservoir 1 is adapted to be conveyed from the reservoir into the burner 3 by means of the wick which is also of tubular formation for the purpose hereinafter to be more fully described. Adapted to extend through the reservoir 1, and the wick 8 and also through the neck portion 5 and the inwardly extending centrally located member 6 by way of the axial bore 7 formed therein, is the needle valve 9. It will be noted from Fig. 1 of the drawings that the tubular neck portion 5 of the burner 3 is provided with internal threads 10 the purpose of which is to receive the threaded circular guide ring 11. The threaded guide ring 11 is adapted to be supported within the threaded neck 5 and is provided with a centrally threaded opening 12 for the purpose of receiving the threaded portion 13 from the needle valve 9. The purpose of this construction is to provide a means for guiding the needle valve when the same is operated and furthermore provide means for maintaining the needle valve in its operative position. The threaded guide ring 11 is furthermore provided with a series of spaced apertures 14 for the purpose of permitting the fuel to be conveyed from the outer end of the wick 8 to the axial bore 7 in the centrally located inwardly extending member 6 and the tapered point of the needle valve 9 which indicates with the tapered end of the axial bore 7 which forms the combustion orifice will be adapted to open and close the combustion orifice whereby the flame is regulated. The reservoir 1 is provided at its rear end with a suitable clamping nut 15 which receives the needle valve 9 and the needle valve 9 extends through the clamping nut 15 and is provided with a suitable handle 16 for the purposes of providing for the rotation of the needle valve 9 whereby the same is caused to be moved inwardly or outwardly to close or open the combustion orifice provided in the tubular body portion of the burner 3.

The tubular body portion 4 is furthermore provided with a series of spaced apertures 16 which are provided in the periphery thereof and these apertures 16 provide air holes for supplying a suitable quantity of air to the combustion orifice within the tubular body portion 4. For the purposes of cutting off the supply of air through the opening 16 whenever it is necessary, I provide a sleeve 17 which is adapted to be received upon the tubular body portion 4 and this sleeve 17 is provided with longitudinal slots 18 arranged in spaced relation and which when in one position registers with the spaced apertures 16 formed in the periphery of the tubular body portion 4. When in registry it will be seen that air is permitted to be supplied to the interior of the tubular body portion 4 and to the combustion oil pipe. For the purposes of cutting off the supply of air, the sleeve 17 is provided with a handle 19 whereby the sleeve may be rotated in either direction to cause the longitudinal slot 18 formed therein to be out of registry with the openings 16 in the tubular body portion 4 thereby preventing the air from entering the interior of the combustion chamber in the burner 3. It is to be noted that the sleeve 17 may be threaded on the tubular body portion 4 adjacent the neck portion 5 thereof as more clearly shown at 17' in the drawings. It is also seen in the drawings that the sleeve 17 extends on the tubular body portion 4 to a point adjacent the outer end of the burner 3 and which is open. The purpose of this arrangement will be more fully described in the following paragraph.

The open end of the burner 3 supports the socket member 20 and this socket member 20 is adapted to receive in its free end the head 21 of the various tools as shown in the different views in the drawings. The head 21 of the tools are provided with an annular groove 22 adjacent the inner end thereof for the purpose of permitting the heads 21 to be detachably supported in the socket member 20 and the annular groove 22 is adapted to receive the set screw 23 which is carried by the socket member 20 for the purpose of holding the tools in proper position upon the socket member 20.

It will be also noted from the drawings that the tubular body portion 4 adjacent the open end thereof and the socket member, and the heads of the various tools are provided with circumscribing apertures 25 which act in the capacity of exhaust openings for the gas flames.

It is to be further noted that I have shown various types of tools which may be used in connection with my heater and the construction of my heater enables the same to be used for the different types of tools as shown thereby permitting the same heater to be used for various purposes and occasions.

In operation, after the desired tool has been placed in position within the socket member 20 and secured therein, the needle valve 9 is operated through the medium of the valve and handle 16 to open the combustion oil pipe formed in the inwardly extending centrally located member 6 and it will be seen that the wick 8 which absorbs the gasoline contained within the reservoir 1 will cause some of the liquid used to pass through the neck portion 5 to the threaded guide ring 11 and into the axial bore 7 and when the sleeve 17 is rotated on the tubular body portion 4 so as to permit the longitudinal spaced slots 18 provided in the sleeve to register with the opening 16 in the body portion 4, a quantity of air will mix with the fuel at the combustion orifice and when the same is ignited, the flame will at once take place and give the proper heating facilities necessary for the use of the tool. It will further be seen that the apertures provided in the body portion 4 will create a proper draft for the proper facilitation and assuring the proper flame and exhaust gases will pass through the apertures 25.

With a tool of the above mentioned character, it will be seen that the simplicity of the same renders it very useful and efficient for use in various places and for different kinds of work and is of such a construction as to enable the same to be easily handled without any danger of injuring the operator and furthermore can be maintained at a minimum cost.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be restorted to, without departure from the spirit or sacrificing any of the principles of the invention.

What I claim as new and desire to secure by Letters Patent is:—

1. In a device of the class described comprising a reservoir, a hollow shank extending therefrom, a burner comprising a tubular body portion having a tubular neck portion at one end, the opposite end being open, said tubular neck portion attached to the outer end of said shank, an inwardly extending centrally located member carried by said tubular body portion and having an axial bore therein forming a combustion orifice, a tubular wick extending from said reservoir through said shank and into said neck portion, a needle valve extending through said reservoir, shank and inwardly extending central member to open and close said combustion orifice, means in said neck portion to guide and support said needle valve, and an implement detachably secured in the open end of said tubular body portions.

2. In a device of the class described comprising a reservoir, a hollow shank extending therefrom, a burner comprising a tubular body portion having a tubular neck portion at one end the opposite end being open, said tubular neck portion secured to the outer end of said shank, an inwardly extending centrally located member carried by said tubular body portion and formed adjacent the tubular neck portion thereof, said inwardly extending centrally located member having an axial bore forming a combustion orifice, a tubular wick extending from said reservoir through said hollow shank and into said neck portion, a needle valve extending through said reservoir, shank and inwardly extending located member to open and close the combustion orifice, guide means in said tubular neck portion for said heater valve, said tubular body portion provided with spaced apertures in the periphery thereof, means for closing said apertures, and an implement detachably secured in the open end of said tubular body portion.

3. In a device of the class described comprising a reservoir, a hollow shank extending therefrom, a burner comprising a tubular body portion having a tubular neck portion at one end the opposite end being open, said tubular neck portion secured to the outer end of said shank, an inwardly extending centrally located member carried by said tubular body portion and formed adjacent the tubular neck portion thereof, said inwardly extending centrally located member having an axial bore forming a combustion orifice, a tubular wick extending from said reservoir through said hollow shank into said neck portion, a needle valve extending through said reservoir, shank and inwardly extending centrally located member to open and close the combustion orifice, guide means in said tubular neck portion for said needle valve, said tubular body portion provided with spaced apertures in the periphery thereof, means for closing said apertures, a socket member carried by the open end of said tubular body portion, and an implement detachably secured in said socket member.

4. In a device of the class described comprising a reservoir, a hollow shank extending therefrom, a burner comprising a tubular body portion having a tubular neck portion at one end the opposite end being open, said tubular neck portion secured to the outer end of said shank, an inwardly extending centrally located member carried by said tubular body portion and formed adjacent the tubular neck portion thereof, said inwardly extending centrally located member having an axial bore forming a combustion orifice, a tubular wick extending from said reservoir, through said hollow shank into said neck portion, a needle valve extending through said reservoir, shank and inwardly extending centrally located member to open and close the combustion orifice, guide means in said tubular neck portion for said needle valve, said tubular body portion provided with spaced apertures in the periphery thereof, means for closing said apertures, a socket member carried by the open end of said tubular body portion, and an implement detachably secured in said socket member, said socket member and implement provided with spaced apertures to provide an exhaust for the gas flames in said tubular body portion.

5. In a device of the class described comprising a reservoir having an integral elongated hollow shank portion formed thereon, said shank terminating in an externally threaded head, a tubular neck portion internally threaded at its one end and engaged with the threaded end of said head, a portion of said neck being externally threaded and that portion of the neck beyond the threaded portion being reduced and formed into a centrally and inwardly located extending member having a central orifice, a perforated tubular body portion threaded into engagement with the threaded portion of said neck, a tubular wick member extended from the reservoir through the hollow shank and terminating within said neck, a guide member externally threaded into engagement with the internally threaded portion of said neck beyond said wick, said guide member being also provided with an internally threaded bore, a needle valve extending through said wick and having a threaded portion thereon engaged with the internally threaded bore of said guide member, said valve cooperating with the orifice in the end of said neck, and a heating tool engaged with said tubular body portion, as and for the purposes described.

In testimony whereof I affix my signature.

FRED W. MILLER.